United States Patent
Zhao et al.

(10) Patent No.: US 6,727,946 B1
(45) Date of Patent: Apr. 27, 2004

(54) APS SOFT RESET CIRCUIT FOR REDUCING IMAGE LAG

(75) Inventors: Tiemin Zhao, Palo Alto, CA (US); Xinping He, San Jose, CA (US); Qingwei Shan, Cupertino, CA (US); Datong Chen, Fremont, CA (US)

(73) Assignee: OmniVision Technologies, Inc., Sunnyvale, CA (US)

( * ) Notice: Subject to any disclaimer, the term of this patent is extended or adjusted under 35 U.S.C. 154(b) by 0 days.

(21) Appl. No.: 09/461,668

(22) Filed: Dec. 14, 1999

(51) Int. Cl.$^7$ ................................................ H04N 3/14
(52) U.S. Cl. ..................... 348/308; 348/310; 250/208.1
(58) Field of Search ................... 250/208.1; 348/294, 348/296, 297, 298, 300, 301, 302, 307–310; 257/291, 292

(56) References Cited

U.S. PATENT DOCUMENTS

| | | | | |
|---|---|---|---|---|
| 5,854,100 A | * | 12/1998 | Chi | 438/202 |
| 5,952,686 A | * | 9/1999 | Chou | 257/292 |
| 6,111,245 A | * | 8/2000 | Wu | 250/208.1 |

OTHER PUBLICATIONS

Bedabrata Pain, Guang yang, Monico Ortiz, Christopher Wrighley, Bruce Hancock, & Thomas Cunningham: "Analysis and Enhancement of Low–Light Level Performance of Photodiode–Type CMOS Active Pixel Imagers Operated With Sub–Threshold Reset" (Jun. 10–12, 1999) 1999 IEEE Workshop on Charge–Coupled Devises and Advanced Image Sensors.

* cited by examiner

*Primary Examiner*—Ngoc-Yen Vu
(74) *Attorney, Agent, or Firm*—Perkins Coie LLP

(57) ABSTRACT

An improved active pixel sensor soft reset circuit for reducing image lag while maintaining low reset kTC noise. The circuit pulls down the sensor potential to a sufficiently low level before the soft reset function is completed. The level to which the sensor potential is pulled is set between 0 and the critical potential at which the reset transistor will be on when the soft reset function begins. The timing of the pull down function is such that the sensor is stabilized at the low potential before the soft reset function completes. In one embodiment, the sensor potential is pulled down using a pull-down circuit, which may consist of a CMOS type inverter. In another embodiment, the sensor potential is pulled down by the bit line. Two ways in which the bit line may be pulled down are natural discharge, or by increasing the bias on the loading transistor. Two ways in which the bias on the loading transistor may be increased are a biasing circuit, or by using a pull-down transistor. The active pixel sensor may be implemented with any suitable sensor technology, such as photodiode, photogate, or pinned diode.

22 Claims, 6 Drawing Sheets

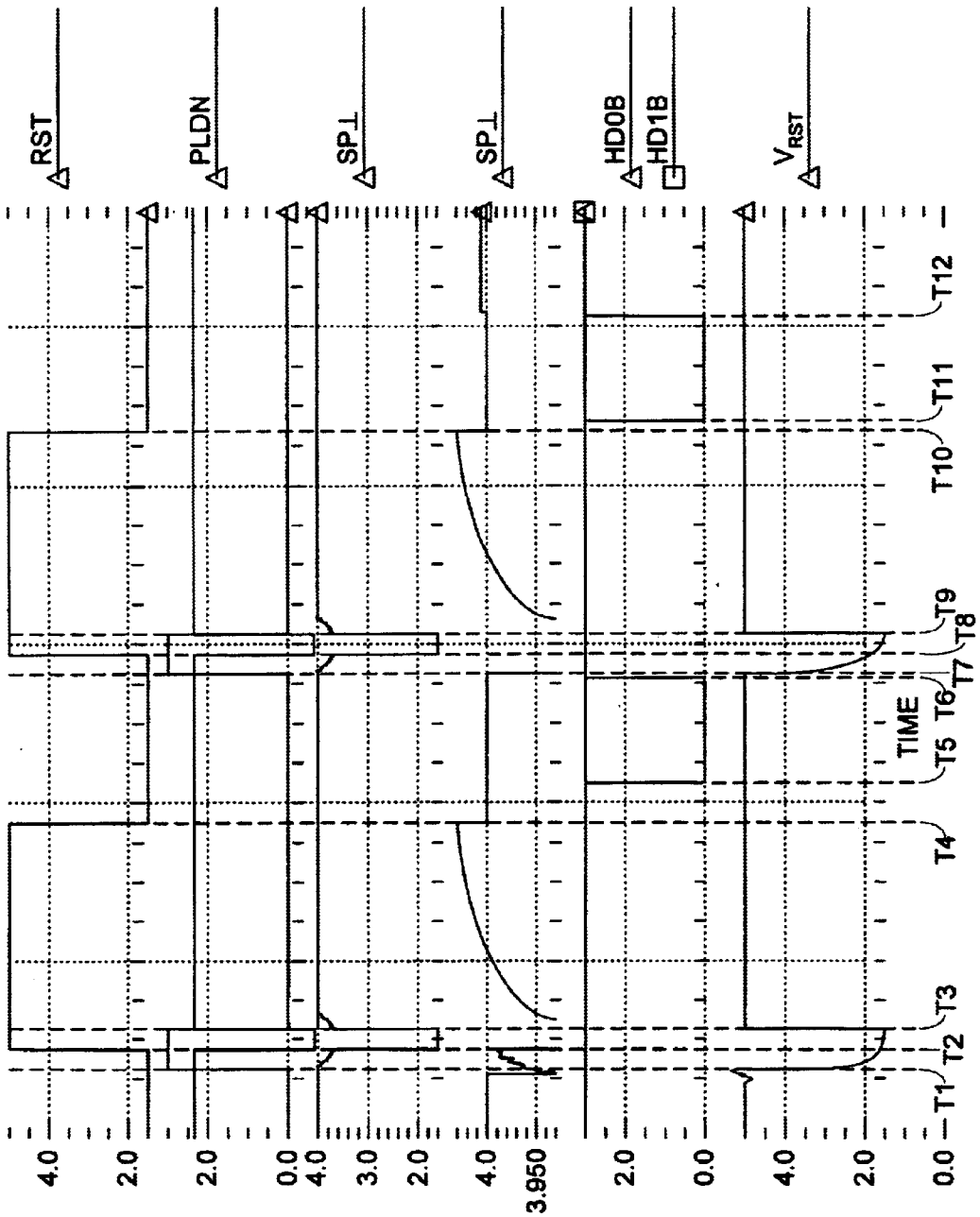

APS SOFT RESET CIRCUIT FOR REDUCING IMAGE LAG

FIELD OF THE INVENTION

The present invention relates to metal oxide semiconductor (MOS) image sensors and, more particularly, to reset circuits for active pixel sensors (APS) in a CMOS array.

BACKGROUND OF THE INVENTION

Integrated circuit technology has revolutionized various fields including computers, control systems, telecommunications, and imaging. There are a number of types of semiconductor imagers, including charge coupled devices, photodiode arrays, charge injection devices, and hybrid focal plane arrays. Some sensors are referred to as active pixel image sensors (APS). An active pixel image sensor is defined as an image sensor technology that has one or more active transistors within the pixel unit cell. Some types of active pixel sensor technologies include the amplified MOS imager (AMI), charge modulation device (CMD), volt charge modulated device (VCMD), base stored image sensor (BASIS), and the static induction transistor (SIT).

One prior art circuit using a CMOS photodiode-type active pixel sensor is shown in "128×128 CMOS Photodiode-Type Active Pixel Sensor With On-Chip Timing, Control And Signal Chain Electronics," by R. H. Nixon et al., *Proceedings of the SPIE-The International Society for Optical Engineering*, Volume 2415, 1995, pages 117–123. FIG. 2 of that reference has been reproduced herein as FIG. 1.

FIG. 1 is a schematic diagram of a CMOS APS, along with readout circuits. The pixel unit cell 25 consists of a photodiode (PD), a source-follower input transistor SF1, a row-selection transistor ROW and a reset transistor RESET which controls lateral blooming through proper biasing of its gate. The drain diffusion 50 is coupled to the voltage source $V_{DD}$. At the bottom of each column of pixels, there is a column circuit 60 consisting of a load transistor VLN1 and two output branches to store the reset and signal levels. Each branch consists of a sample and hold capacitor (CS or CR) with a sampling switch (SHS or SHR) and a second source-follower SF2 with a column-selection switch (COL). The reset and signal levels are read out differentially, allowing correlated double sampling to suppress 1/f noise and fixed pattern noise (not kTC noise) from the pixel. A double delta sampling (DDS) circuit shorts the sampled signals during the readout cycle reducing column fixed pattern noise. These readout circuits 60 are common to an entire column of pixels. A read-out circuit 70 that is common to the entire array includes load transistors (VLN2) of the second set of source followers (VLP) and the subsequent clamp circuits CLAMP and output source followers SF3 and SF4.

Timing for the readout sequence is as follows. After a row has been selected, the signal that is present on each column pixel in that row is sampled (SHS) onto the holding capacitor CS. Next, each pixel in the row is reset (RESET). This is followed by sampling the reset level (SHR) onto holding capacitor CR. A simplified expression for the output voltage of the reset branch of the column circuit is given by:

$$Vcol\_R \approx \beta\{\alpha[V_{pdr}-V_{tpix}]-V_{tcolr}\}$$

where $\alpha$ is the gain of the pixel source-follower, $\beta$ is the gain of the column source-follower, $V_{pdr}$ is the voltage on the photodiode after reset, $V_{tpix}$ is the threshold voltage of the pixel source-follower n-channel transistor, and $V_{tcolr}$ is the threshold voltage of the column source-follower p-channel transistor. Similarly, the output voltage of the signal branch of the column circuit is given by:

$$Vcol\_S \approx \beta\{\alpha[V_{pds}-V_{tpix}]-V_{tcols}\}$$

where $V_{pds}$ is the voltage on the photodiode with the signal charge present and $V_{tcols}$ is the threshold voltage of the column source-follower p-channel transistor. Experimentally, the peak to peak variation in $V_{tcolr}-V_{tcols}$ is typically 10–20 mV. It is desirable to remove this source of column-to-column fixed pattern noise FPN. JPL has previously developed a double delta sampling (DDS) technique to eliminate the column-to-column FPN. This approach represents an improved version of the DDS circuitry.

Sequential readout of each column is as follows. First a column is selected. After a settling time equivalent to one-half the column selection period, the DDS is performed to remove column fixed pattern noise. In this operation, a DDS switch and two column selection switches on either side are used to short the two sample and hold capacitors CS and CR. Prior to the DDS operation the reset and signal column outputs (Vcol_R and Vcol_S) contain their respective signal values plus a source follower voltage threshold component. The DDS switch is activated immediately after CLAMP is turned off. The result is a difference voltage coupled to the output drivers (VR_OUT and VS_OUT) that is free of the voltage threshold component.

One problem of this circuit is that the implementation of the active pixel cell 25 continues to have the problems related to the design choice between hard reset and soft reset implementations. The choice between these implementations determine how the reset signal RST and the voltage on the drain diffusion 50 (hereafter designated as $V_{RST}$) will be controlled. In the implementation illustrated in FIG. 1, a soft reset implementation is shown, in that the voltage $V_{RST}$ on the drain diffusion 50 is shown to be $V_{DD}$. This is a typical prior art implementation in which $V_{RST}=V_{DD}=$RST. One definition of a soft reset system is where the signal (shown as $V_{DD}$ on the drain diffusion 50 in FIG. 1) is greater than the reset voltage RST, minus a threshold voltage $V_T$. This soft reset definition is illustrated in the equation:

$$\text{soft reset: } V_{RST} > RST - V_T \tag{1}$$

where the threshold voltage $V_T$ is a variable, depending on sensor potential. Also, the theoretical equation for the noise in a soft reset system is:

$$\text{soft reset: Noise} = \frac{1}{2}\sqrt{\frac{KT}{C}} \tag{2}$$

In contrast, one definition of a hard reset system is where the $V_{RST}$ level is less than the reset signal RST minus the threshold voltage $V_T$. This hard reset definition is illustrated in the equation:

$$\text{hard reset: } V_{RST} < RST - V_T \tag{3}$$

And the theoretical equation for the noise in the hard reset method is:

$$\text{hard reset: Noise} = \frac{1}{2}\sqrt{\frac{KT}{C}} \quad (4)$$

The hard reset and soft reset equations (1) and (3) illustrate that there is a critical voltage $V_{CR}$ which marks the boundary between a soft reset and a hard reset. This critical voltage is defined by the equation:

$$\text{critical voltage: } V_{CR} = RST - V_T \quad (5)$$

The advantages of the hard reset method is that it is fast and uniform, but in theory it suffers from approximately twice the reset noise problems (kTC noise) of the soft reset method. In contrast, the soft reset method has less reset noise, but causes image lag, because the reset is incomplete due to the reset transistor operating in the subthreshold region.

The present invention is directed to a method and apparatus that overcome the foregoing and other disadvantages. More specifically, the present invention is directed to a method and apparatus for reducing image lag through an improved soft reset circuit for an active pixel sensor (APS).

SUMMARY OF THE INVENTION

An improved active pixel sensor soft reset circuit for reducing image lag is provided. The active pixel sensor circuit includes a sensor for outputting a sensor potential, and a reset transistor for resetting the sensor. A buffer transistor buffers the output of the sensor, and a row select transistor is used for the read-out function. The row select transistor is coupled between the buffer transistor and a bit line. The bit line is also coupled to a loading transistor.

In accordance with one aspect of the invention, the sensor potential is pulled down to a sufficiently low level during a pull down function that may be implemented before and/or during the soft reset function. If the sensor potential is pulled down during the soft reset function, the pull down time is made to be less than the soft reset time. The low level is set between 0 and the critical potential at which the reset transistor will be on when the soft reset function starts. The timing of the pull down function should stabilize the sensor at the low potential before the actual soft reset function begins.

In accordance with another aspect of the invention, the sensor potential is pulled down by a pull-down circuit. In one embodiment, the pull-down circuit may consist of an NMOS transistor and PMOS transistor, coupled together as a CMOS inverter.

In accordance with another aspect of the invention, the sensor potential may be pulled down by the bit line. The bit line in turn, may be pulled down in a number of different ways. One way for the bit line to be pulled down is through natural discharge. A way to increase the speed with which the bit line is pulled down is to increase the bias on the loading transistor. One way to increase the bias on the loading transistor is to use a special biasing circuit to increase the bias. Another way to increase the bias on the loading transistor is to use a pull-up transistor, which may be either an NMOS transistor or a PMOS transistor.

It will be appreciated that the disclosed method and apparatus for an improved active pixel sensor soft reset circuit is able to obtain the advantages of a hard reset, while maintaining the low reset (kTC) noise of a soft reset. The image lag problem of other soft reset implementation methods is reduced. Furthermore, the active pixel sensor may be implemented using any suitable technology, such as photodiode, photogate, or pinned diode.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 6A–6F are a series of timing diagrams illustrating the operation of an active pixel sensor circuit according to the present invention.

DETAILED DESCRIPTION OF THE PREFERRED EMBODIMENT

Figure 2:
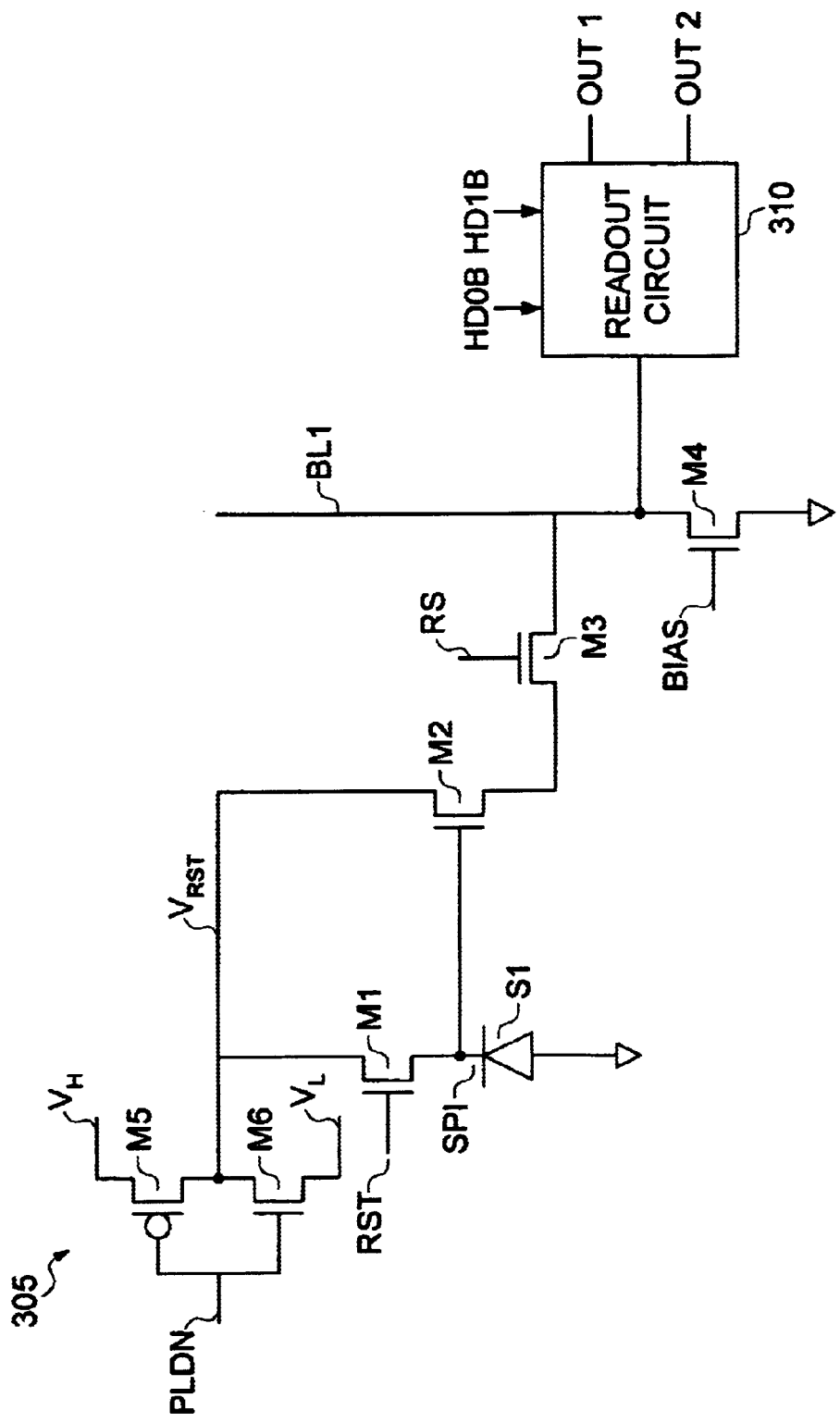
FIG. 2 is a schematic diagram of an active pixel sensor cell wherein the $V_{RST}$ level is controlled by a CMOS inverter circuit.

An active pixel sensor circuit formed according to the present invention is illustrated in FIG. 2. The circuit includes a sensor S1 which outputs a sensor potential SP1 according to a photo response. The sensor S1 is coupled between ground and the reset transistor M1. In the present NMOS embodiment, the reset transistor M1 is shown as an NMOS transistor, but it will be appreciated that the circuit could also be implemented in PMOS or CMOS, in which case the type of transistors used for the transistors such as transistor M1 may be different. The gate of the reset transistor M1 is coupled to a reset signal RST, while the drain of the reset transistor M1 is coupled to a voltage line $V_{RST}$. Thus, when the NMOS transistor M1 is biased in a conducting state by the reset signal RST, a signal path exists from the voltage line $V_{RST}$ to the sensor potential SP1. As will be described in more detail below, in accordance with the present invention, the sensor potential SP1 may therefore be pulled down by reducing the voltage on the voltage line $V_{RST}$.

An NMOS buffer transistor M2 also has its drain coupled to the voltage line $V_{RST}$, while the gate of the buffer transistor M2 is coupled to the sensor potential SP1 of the sensor S1. In other embodiments, the drain of transistor M2 may be coupled to a fixed voltage such as $V_{DD}$ rather than the voltage line $V_{RST}$. The source of the buffer transistor M2 is coupled to the drain of an NMOS row select transistor M3. The gate of the row select transistor M3 receives a row select control signal RS, while the source of the row select transistor M3 is coupled to the bit line BL1. An NMOS loading transistor M4 is coupled between the bit line BL1 and the ground. The gate of the loading transistor M4 receives a biasing control signal BIAS.

The bit line BL1 is also coupled as an input to a readout circuit 310. Readout circuit 310 receives control signals HD0B and HD1B, and outputs signals OUT1 and OUT2.

Figure 1:
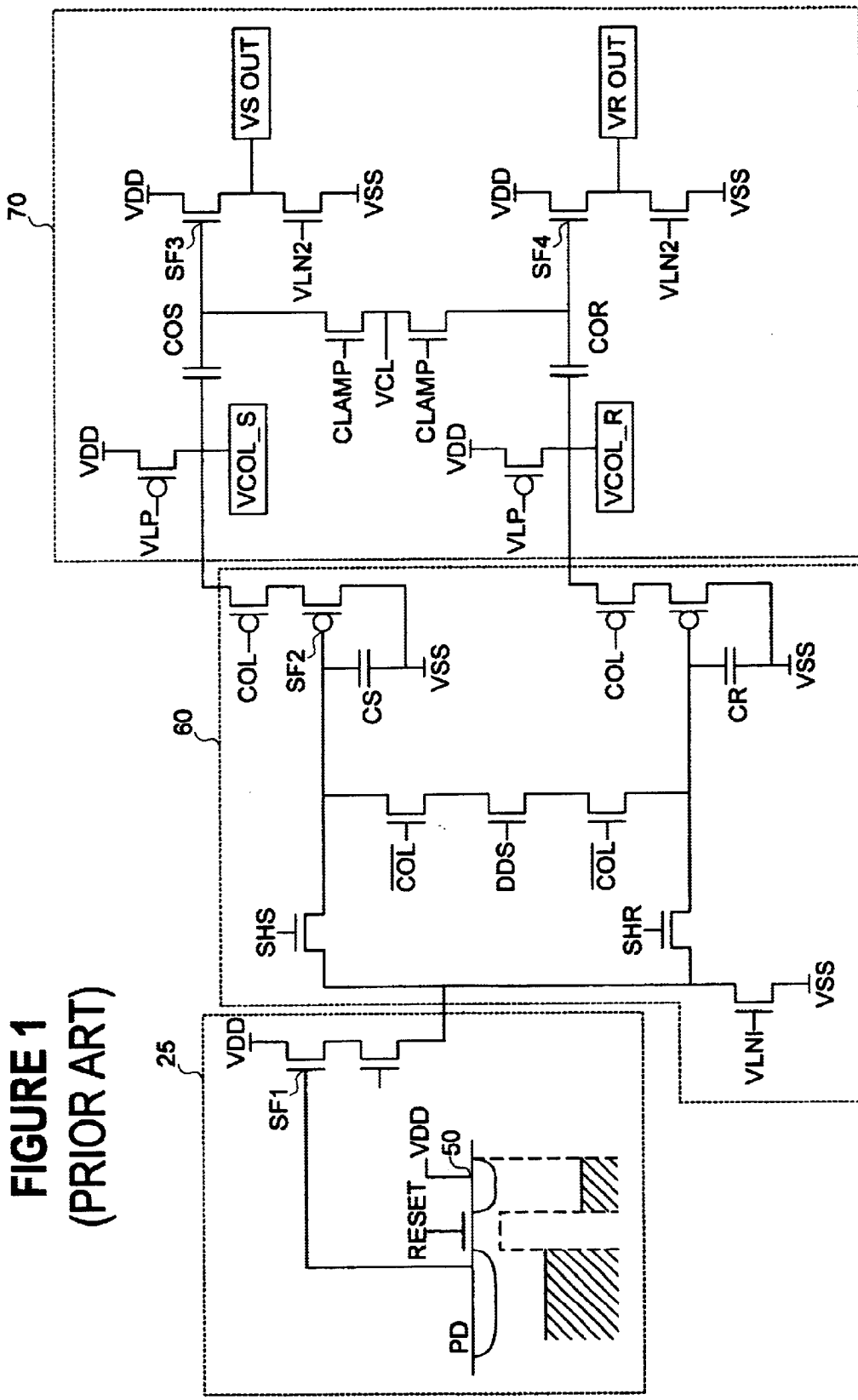
FIG. 1 is a schematic diagram of a prior art CMOS active pixel sensor array.

The readout circuit 310 may operate similarly to the readout circuit 70 of FIG. 1, as described in more detail below with reference to FIGS. 6A and 6F.

In a first embodiment of the invention, the voltage on the voltage line $V_{RST}$ is controlled by a pull-down circuit, which includes a CMOS inverter 305. The CMOS inverter circuit 305 is comprised of a PMOS transistor M5 and an NMOS transistor M6. The gates of the PMOS transistor M5 and NMOS transistor M6 are coupled together, and receive a pull-down control signal PLDN. The source of the PMOS transistor M5 is coupled to a fixed voltage level $V_H$. The level of the fixed voltage $V_H$ is preferably set according to the following equation:

$$V_H > V_{DD} - V_T \quad (6)$$

The drain of the PMOS transistor M5 and the drain of the NMOS transistor M6 are coupled together and are also coupled to the voltage line $V_{RST}$. The source of the NMOS transistor M6 is coupled to a fixed voltage level $V_L$. The level of the fixed voltage $V_L$ is preferably set according to the following equation:

$$V_L < V_{DD} - V_T \quad (7)$$

The CMOS inverter circuit described above is able to adjust the voltage level on the voltage line $V_{RST}$, as controlled by the pull-down control signal PLDN. In one embodiment, the set voltage $V_H$ may be set at $V_{DD}$, while the set voltage $V_L$ is set at ground. As will be explained in more detail below with reference to the timing diagrams of FIG. 6, these levels will allow the signal line $V_{RST}$ to be switched to ground before the soft reset function is performed, and back to $V_{DD}$ after the sensor potential SP1 is pulled to its low level, which is defined by being less than the critical voltage $V_{CR}$.

In another embodiment of the invention, the set voltage $V_H$ can be set at $V_{DD}$ while the set voltage $V_L$ is set at a voltage level V1. The voltage level V1 can be selected to be above ground but below the critical voltage $V_{CR}$. In this embodiment, the voltage line $V_{RST}$ will be switched to the voltage level V1 before the soft reset function is performed, but then back to $V_{DD}$ after the sensor potential SP1 is pulled to is low level (below the critical voltage $V_{CR}$).

Figure 3:
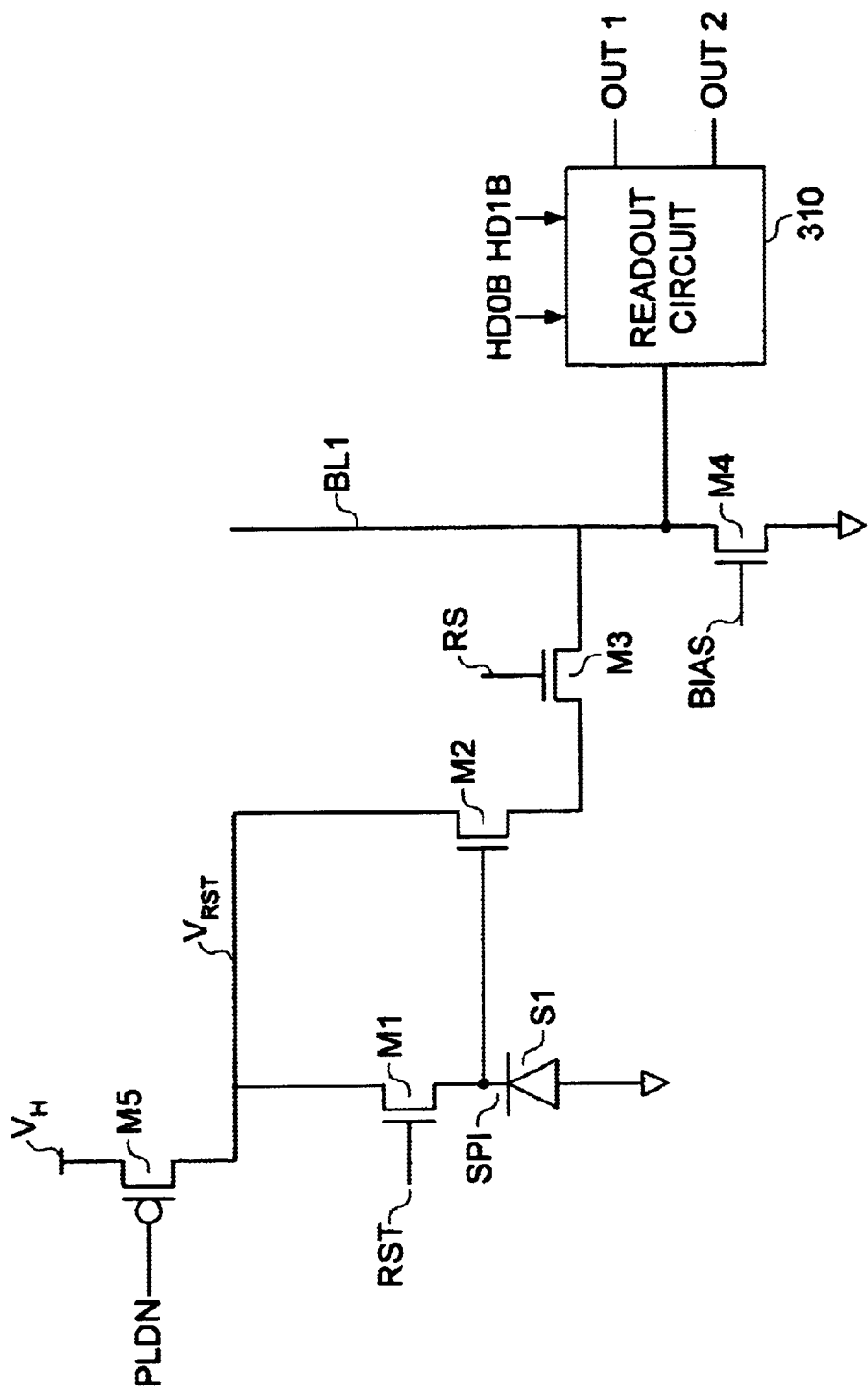
FIG. 3 is a schematic diagram wherein the $V_{RST}$ level is pulled down by the natural discharge of the bit line.

Another embodiment of the invention is illustrated in FIG. 3. The circuitry of FIG. 3 is similar to that of FIG. 2, with the exception that the NMOS transistor M6 has been removed. In this embodiment, the sensor potential SP1 is pulled to low (below the critical voltage $V_{CR}$) by the bit line BL1 before the soft reset function is performed. The sensor potential SP1 may be pulled down by the bit line BL1, in that a signal path may be created from the sensor potential SP1 to the bit line BL1 when each of the transistors M1, M2, and M3 are biased in a conducting state. Thus, the reset signal RST and the row select RS signals should be on for the pull down to be effective. It should be noted that the voltage line $V_{RST}$ is part of this signal path between the transistors M1 and M2. It should also be noted that in this embodiment no additional circuitry is required to pull down the voltage on the bit line BL1, as this embodiment relies on the natural discharge phenomena to pull down the voltage on the bit line BL1. However, while this embodiment has the advantage of not requiring additional circuitry, the natural discharge technique is slower than some of the other schemes discussed below.

Figure 4:
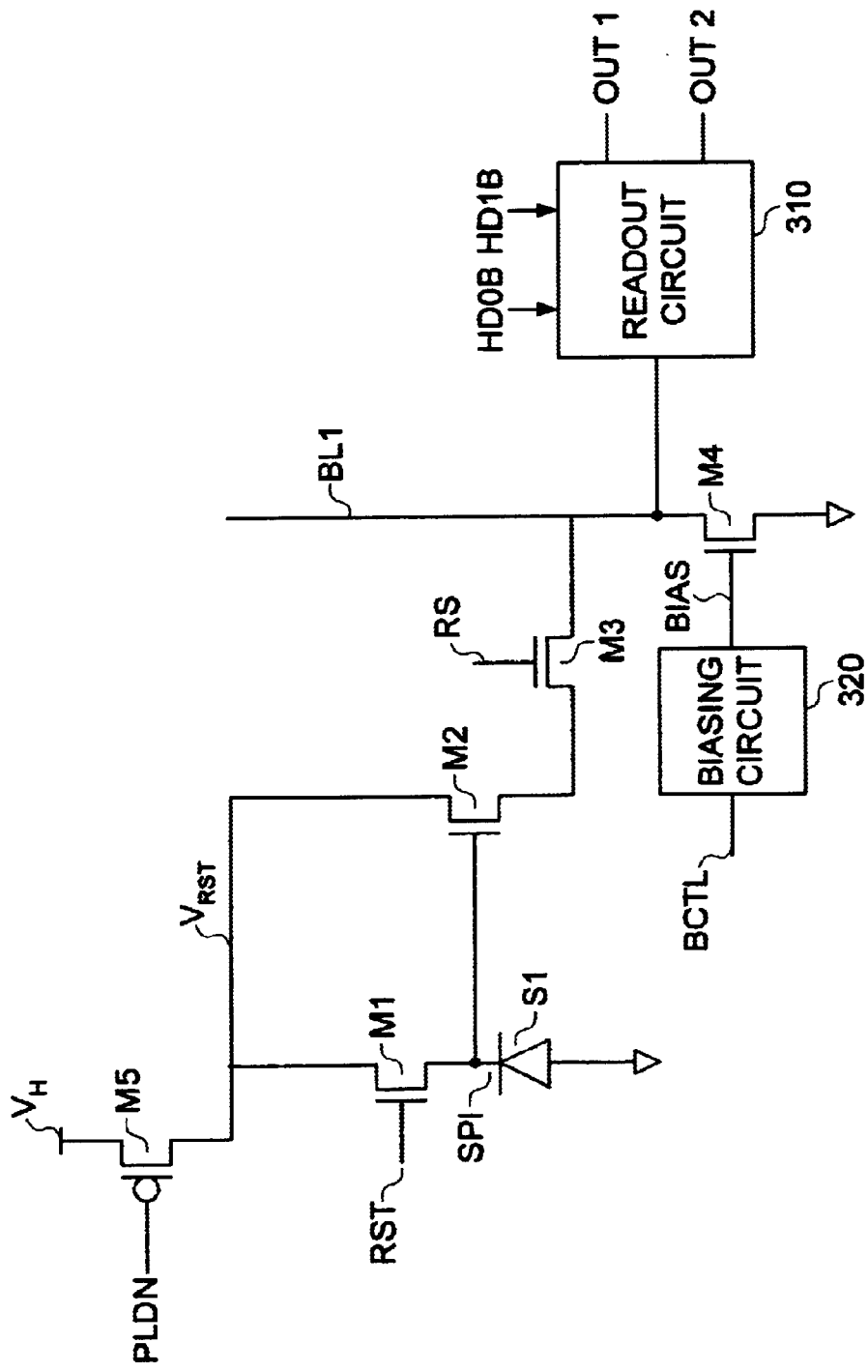
FIG. 4 is a schematic diagram wherein the $V_{RST}$ level is pulled down by the bit line which in turn is pulled down by using a biasing circuit to increase the bias on the loading transistor.

FIG. 4 illustrates another embodiment of the invention. The circuitry of FIG. 4 is similar to that of FIG. 3, with the addition of a biasing circuit 320. As shown in FIG. 4, the biasing circuit 320 generates the bias signal BIAS for the loading transistor M4. The biasing circuit 320 is controlled by a control signal BCTL.

In the embodiment of FIG. 4, the sensor potential SP1 is pulled to low (below the critical voltage $V_{CR}$) by the bit line BL1 before the soft reset function is performed. The bit line BL1 in turn is pulled down through the operation of the biasing circuit 320 which is controlled by the control signal BCTL to increase the bias signal BIAS on the loading transistor M4. Thus, the biasing circuit 320 is used to increase the speed with which the bit line BL1 is pulled down, thus increasing the speed at which the voltage line $V_{RST}$, and the corresponding sensor potential SP1 is pulled to a low level.

Figure 5:
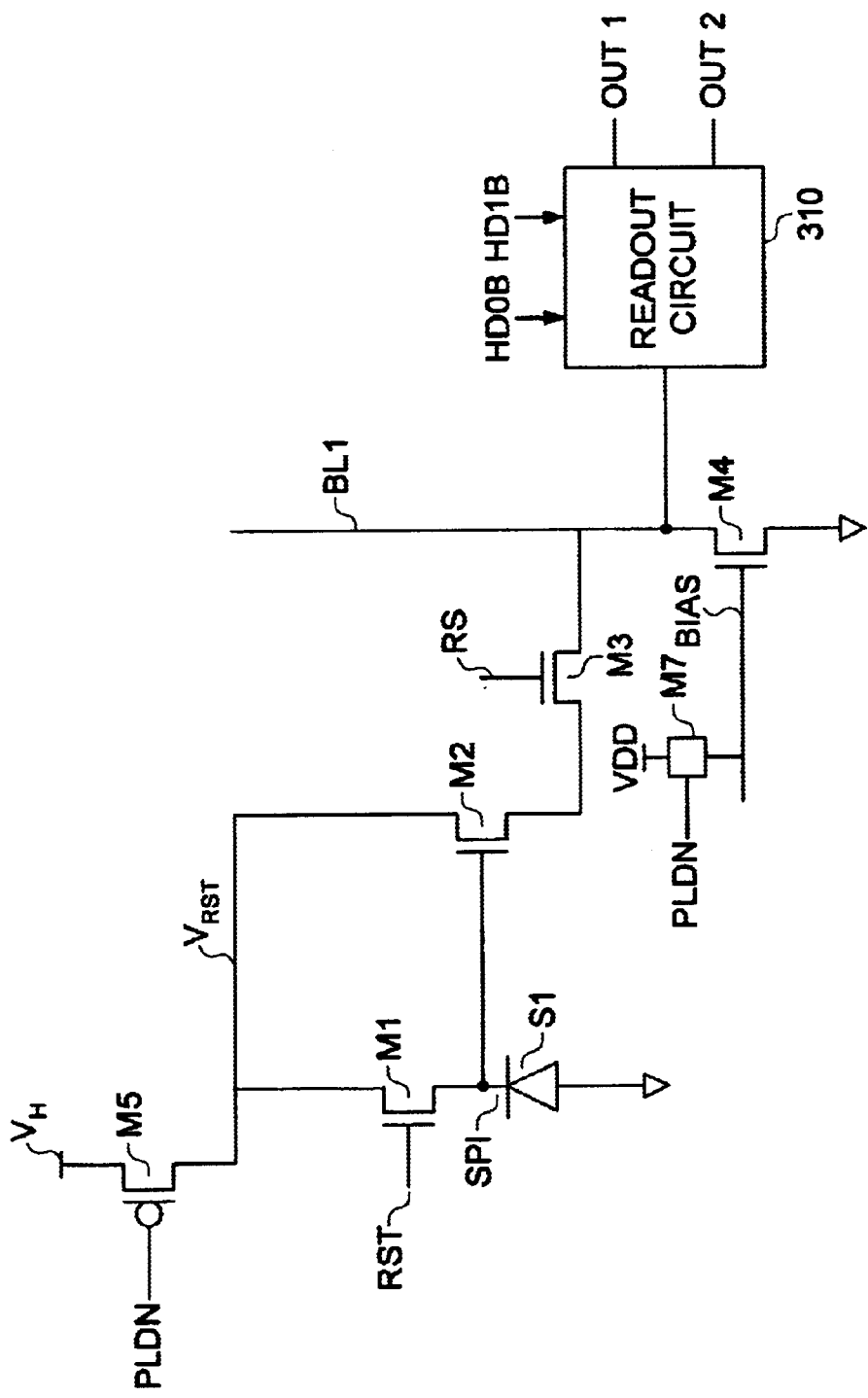
FIG. 5 is a schematic diagram wherein the $V_{RST}$ level is pulled down by the bit line which in turn is pulled down by using a pull-up transistor to increase the bias on the loading transistor.

FIG. 5 illustrates another embodiment of the invention. The circuitry of FIG. 5 is similar to that of FIG. 3, only with the addition of a pull-up transistor M7. As shown in FIG. 5, the pull-up transistor M7 is coupled between a set voltage such as $V_{DD}$ and the biasing signal BIAS for the loading transistor M4. The gate of the pull-up transistor M7 receives the control signal PLDN.

In one embodiment, the pull-up transistor M7 may be an NMOS transistor, while in another embodiment the pull-up transistor M7 may be a PMOS transistor. When the pull-up transistor M7 is a PMOS transistor, the polarity of the control signal PLDN that is applied to the gate of the transistor should be reversed. In either case, the sensor potential SP1 is pulled to low (below the critical voltage $V_{CR}$) by the bit line BL1 before the soft reset function is performed. The voltage on the bit line BL1 is pulled down more quickly by the control signal PLDN causing the pull-up transistor M7 to increase the bias signal BIAS on the loading transistor M4.

FIGS. 6A–6F show a series of timing diagrams illustrating the operation of an active pixel sensor circuit in accordance with the present invention. FIG. 6A shows the reset signal RST, and FIG. 6B shows the pull-down control signal PLDN. As illustrated in FIG. 6B, at a time T1 the pull-down control signal PLDN goes high. At a time T2, the reset signal RST goes high. The signals are transitioned in this sequence because it is considered advantageous to start the pull down process that is controlled by the control signal PLDN a little before the transitioning of the reset signal RST. This is done to better prepare the sensor S1 for the reset process. This increases the stability of the process with regard to the sensor potential oscillations, thus allowing the signal to stabilize faster, and thereby improving the reset time.

It is further noted that, as illustrated in FIG. 6F, at time T1 when the control signal PLDN transitions high, the voltage level on the voltage line $V_{RST}$ transitions downward in a decreasing curve. At time T2 the voltage on the voltage line $V_{RST}$ is seen to be at a low level, and at time T3 the voltage on the voltage line $V_{RST}$ is seen to transition rapidly upward with the downward transitioning of the control signal PLDN.

FIGS. 6C and 6D show the sensor potential SP1. FIG. 6D is intended to show a more detailed section of the top of the signal range, thus providing a closer look at the transitions occurring at the top of the signal of FIG. 6C. As illustrated in FIGS. 6C and 6D, the upward transitioning of the pull-down control signal PLDN at time T1 causes the sensor potential SP1 to trend slightly downward. At time T2, when the reset signal RST transitions upward, the sensor potential SP1 is pulled down sharply. At time T3 when the pull-down control signal PLDN transitions downward, the sensor potential is pulled rapidly upward. As best illustrated in FIG. 6D, the upward transition of the sensor signal S1 follows an increasing curve until time T4, when the reset signal RST transitions downward. At this point, the sensor potential SP1 drops by a small amount as caused by charge injection, which occurs due to the capacitive coupling of the reset signal RST to the sensor S1.

As illustrated in FIG. 6E, at time T5, the control signal HD0B goes low, and remains low until it transitions back upward at time T6. The control signal HD0B performs a readout function through the operation of the readout circuit 310. As noted earlier, the readout circuit 310 may operate similarly to the readout circuit 70 of FIG. 1.

Beginning at time T7, the cycle again repeats as per the correlated double sampling process described above with reference to FIG. 1. Accordingly, as illustrated in FIG. 6E, at time T11 the control signal HD1B transitions low, and remains low until time T12 when it again transitions high. This allows for the second reading function as part of the correlated double sampling process.

Thus, as illustrated above, the present invention provides an improved method for clearing the charge in the well of the sensor S1 as part of the reset function. By pulling down the sensor potential prior to performing the soft reset function, image lag is reduced. As noted above, in the prior art methods for the soft reset implementation, image lag resulted because the reset was incomplete due to the reset transistor operating in the subthreshold region. The present invention addresses this problem by pulling down the sensor potential before the soft reset, so that a more complete reset can be performed. This method produces lower reset (kTC) noise than is normally associated with a hard reset implementation.

While the preferred embodiment of the invention has been illustrated and described, it will be appreciated that various changes can be made therein without departing from the spirit and scope of the invention. For example, the sensor S1 described above could be implemented as a photodiode, a photogate, or a pinned diode. In addition, while the sensor circuits described above have generally been shown as being constructed in NMOS, the same general principals could be equally applied to PMOS or CMOS circuits. Also, while the low voltage level has generally been illustrated as being placed on the reset voltage line before the reset function, it could also be placed on the reset voltage line during the reset function, although in such cases the pull down time should generally be made to be less than the reset time. As illustrated by these examples, one of ordinary skill in the art after reading the foregoing specification will be able to affect various changes, alterations, and substitutions of equivalents without departing from the broad concepts disclosed. It is therefore intended that the scope of the Letters Patent granted hereon be limited only by the definitions contained in the appended claims and equivalents thereof, and not by limitations of the embodiments described herein.

The embodiments of the invention in which an exclusive property or privilege is claimed are defined as follows:

1. An active pixel sensor circuit, comprising:
   a sensor for producing a sensor potential;
   a pull-down circuit for implementing a pull down function during which the sensor potential is pulled down below a selected critical level;
   a reset voltage line coupled to the pull-down circuit; and
   a reset transistor coupled between the reset voltage line and the sensor, wherein during the pull down function the reset transistor is conducting and the pulldown circuit operates to pull down the sensor potential below the, selected critical level, the pull down function being performed prior to the completion of a reset function when the sensor potential is reset to a selected level;
   wherein the pull-down circuit places a first low voltage level on the reset voltage line, and then places a second high voltage level on the reset voltage line after the sensor potential has been pulled below the selected critical level;
   further wherein the pull-down circuit places the first low voltage level on the reset line while the reset transistor is conducting, and the pull down function is made to be shorter than the total time that the reset transistor is conducting.

2. The active pixel sensor circuit of claim 1, wherein the first low voltage level is approximately at the ground level.

3. The active pixel sensor circuit of claim 1, wherein the sensor comprises a photodiode, photogate or pinned diode.

4. The active pixel sensor circuit of claim 1, wherein the selected critical level is determined according to the potential at which the reset transistor will be on when the reset function starts.

5. The active pixel sensor circuit of claim 1, wherein the timing of the pull down function is such that the sensor is stabilized at a level below the selected critical level before the reset function starts.

6. An active pixel sensor circuit, comprising:
   a sensor for producing a sensor potential;
   a pull-down circuit for implementing a pull down function during which the sensor potential is pulled down below a selected critical level;
   a reset voltage line coupled to the pull-down circuit; and
   a reset transistor coupled between the reset voltage line and the sensor, wherein during the pull down function the reset transistor is conducting and the pulldown circuit operates to pull down the sensor potential below the, selected critical level, the pull down function being performed prior to the completion of a reset function when the sensor potential is reset to a selected level;
   wherein the pull-down circuit places a first low voltage level on the reset voltage line, and then places a second high voltage level on the reset voltage line after the sensor potential has been pulled below the selected critical level;
   wherein the first low voltage level is above the ground level but below the selected critical level.

7. An active pixel sensor circuit, comprising:
   a sensor for producing a sensor potential;
   a pull-down circuit formed by a PMOS transistor for implementing a pull down function during which the sensor potential is pulled down below a selected critical level;
   a reset voltage line coupled to the pull-down circuit; and
   a reset transistor coupled between the reset voltage line and the sensor, wherein during the pull down function the reset transistor is conducting and the pulldown circuit operates to pull down the sensor potential below the selected critical level, the pull down function being performed prior to the completion of a reset function when the sensor potential is reset to a selected level,
   wherein the pull-down circuit further comprises an NMOS transistor, the NMOS and PMOS transistors of the pull-down circuit being coupled together as a CMOS inverter.

8. An active pixel sensor circuit, comprising:
   a sensor for producing a sensor potential;
   a pull-down circuit for implementing a pull down function during which the sensor potential is pulled down below a selected critical level;

a reset voltage line coupled to the pull-down circuit;

a reset transistor coupled between the reset voltage line and the sensor, wherein during the pull down function the reset transistor is conducting and the pulldown circuit operates to pull down the sensor potential below the, selected critical level, the pull down function being performed prior to the completion of a reset function when the sensor potential is reset to a selected level, wherein the pull-down circuit comprises a bit line, wherein the bit line is coupled to the sensor during the pull down function to pull the sensor potential below the selected critical level; and a loading transistor coupled to the bit line, and an NMOS pull-up transistor coupled to the loading transistor, wherein the voltage level on the bit line is pulled down during the pull down function by the NMOS pull-up transistor increasing the bias on the loading transistor.

9. The active pixel sensor circuit of claim 8, wherein the voltage level on the bit line is pulled down during the pull down function by natural discharge.

10. An active pixel sensor circuit, comprising:

a sensor for producing a sensor potential;

a pull-down circuit for implementing a pull down function during which the sensor potential is pulled down below a selected critical level;

a reset voltage line coupled to the pull-down circuit;

a reset transistor coupled between the reset voltage line and the sensor, wherein during the pull down function the reset transistor is conducting and the pulldown circuit operates to pull down the sensor potential below the, selected critical level, the pull down function being performed prior to the completion of a reset function when the sensor potential is reset to a selected level, wherein the pull-down circuit comprises a bit line, wherein the bit line is coupled to the sensor during the pull down function to pull the sensor potential below the selected critical level; and a loading transistor coupled to the bit line, and a PMOS pull-up transistor coupled to the loading transistor, wherein the voltage level on the bit line is pulled down during the pull down function by the PMOS pull-up transistor increasing the bias on the loading transistor.

11. A method for implementing a soft reset in an active pixel sensor, the active pixel sensor including a sensor which produces a sensor potential and a reset transistor coupled to the sensor, the method comprising:

(a) determining a selected critical level according to the critical potential at which the reset transistor will be on when the soft reset function begins;

(b) pulling down the sensor potential below the selected critical level before the soft reset function is performed; and (c) implementing the soft reset function to reset the sensor potential to a selected reset level, wherein the sensor potential is pulled down by a pull-down circuit comprising an NMOS transistor and a PMOS transistor coupled together in the form of a CMOS inverter.

12. The method of claim 11, wherein during step (b)the sensor potential is stabilized below the critical level before the soft reset begins at step (c).

13. The method of claim 11, wherein the sensor is coupled through a plurality of transistors to a bit line, and the bit line is used to pull down the sensor potential.

14. The method of claim 13, wherein a loading transistor is coupled to the bit line, and the voltage potential on the bit line is pulled down by increasing bias on the loading transistor.

15. The method of claim 14, wherein the gate of the loading transistor is coupled to a biasing circuit, and the biasing circuit is used to increase the bias on the loading transistor.

16. The method of claim 14, wherein a pull-up transistor is coupled to the gate of the loading transistor, and the pull-up transistor is used to increase the bias on the loading transistor.

17. An active pixel sensor circuit in which a soft reset function is performed, the active pixel sensor circuit comprising:

a sensor which outputs a sensor potential;

a reset transistor coupled to the sensor;

a bit line coupled through a plurality of transistors to the sensor, wherein the sensor potential is pulled below a selected critical level prior to the time when a soft reset function is performed to reset the sensor potential; and a reset voltage line coupled to the reset transistor, a signal path existing between the reset voltage line and the sensor when the reset transistor is biased in a conducting state; and a CMOS inverter circuit coupled through the reset voltage line to the reset transistor for pulling down the sensor potential below the selected critical level.

18. The active pixel sensor circuit of claim 17, wherein the bit line is used to pull the sensor potential below the selected critical level.

19. The active pixel sensor circuit of claim 18, wherein the bit line is coupled to a loading transistor, the voltage potential on the bit line being pulled down by increasing the bias on the loading transistor.

20. The active pixel sensor circuit of claim 19, further comprising a biasing circuit coupled to the loading transistor, the biasing circuit being used to increase the bias on the loading transistor so as to pull down the voltage level on the bit line.

21. The active pixel sensor circuit of claim 19, further comprising a pullup transistor coupled to the gate of the loading transistor, the pull-up transistor increasing the bias on the loading transistor so as to pull down the voltage potential on the bit line.

22. The active pixel sensor circuit of claim 17, wherein the selected critical level is determined according to the potential at which the reset transistor will be on when the soft reset function begins.

\* \* \* \* \*